United States Patent [19]
Fischer

[11] 3,909,232
[45] Sept. 30, 1975

[54] HERBICIDE MIXTURES OF 3-LOWER ALKYL-2,1,3-BENZOTHIADIAZINONE-(4)-2,2-DIOXIDE AND N-(1,1-DIMETHYLPROPYNYL)-3,5-DICHLOROBENZAMIDE

[75] Inventor: Adolf Fischer, Mutterstadt, Germany

[73] Assignee: Badische Anilin- & Soda-Fabrik Aktiengesellschaft, Ludwigshafen (Rhine), Germany

[22] Filed: Jan. 11, 1974

[21] Appl. No.: 432,675

Related U.S. Application Data

[62] Division of Ser. No. 343,629, March 22, 1973.

[30] Foreign Application Priority Data
Apr. 13, 1972  Germany............................ 2217722

[52] U.S. Cl. .......................... 71/91; 71/90; 71/111; 71/114; 71/115; 71/121; 71/124
[51] Int. Cl.² ...................... A01N 9/12; A01N 9/20
[58] Field of Search................................ 71/91, 118

[56] References Cited
UNITED STATES PATENTS
3,534,098  10/1970  Horrom et al. ........................ 71/118
3,700,732  10/1972  Switchenbank ........................ 71/118

3,708,277  1/1973  Zeidler et al. .......................... 71/91

OTHER PUBLICATIONS
Fischer, "Herbicidal compositions," (1971), CA 74, No. 110,714w, (1971).
Fischer, "Herbicidal Compositions containing, etc.," (1971), CA 75, No. 75,217h, (1971).

*Primary Examiner*—Glennon H. Hollrah
*Attorney, Agent, or Firm*—Johnston, Keil, Thompson & Shurtleff

[57] ABSTRACT

Herbicide compositions of mixtures in the weight ratio of 5:1 to 1:5 of (a) 3-lower alkyl-2,1,3-benzothiadiazinone-(4)-2,2-dioxide and (b) a compound of the formula

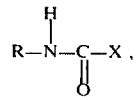

where R denotes methoxy, alkynyl of 5 carbon atoms or a 5-chloro-4-methylthiazolyl radical and X denotes phenoxymethyl bearing halogen and methyl substituents in the phenyl radical, dichlorophenyl, or lower alkyl.

2 Claims, No Drawings

HERBICIDE MIXTURES OF 3-LOWER ALKYL-2,1,3-BENZOTHIADIAZINONE-(4)-2,2-DIOXIDE AND N-(1,1-DIMETHYLPROPYNYL)-3,5-DICHLOROBENZAMIDE

RELATED APPLICATION

This application is a division of my copending application Ser. No. 343,629, filed Mar. 22, 1973, the disclosure of which is incorporated herein by reference.

The present invention relates to a herbicide comprising a composition of several active ingredients.

It is known that substituted phenyl ethers, carbamates, terephthalates, acid amides, benzoic acids, fluorenecarboxylic acids and benzothiadiazinones have a herbicidal action. However, this action is poor.

I have now found that a composition of
a. a compound of the formula

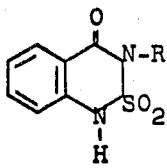

where R denotes lower alkyl of a maximum of 4 carbon atoms, or its salts, such as alkali metal, alkaline earth metal, ammonium, hydroxyalkylammonium, alkylammonium and hydrazine salts, e.g. salts with sodium, lithium, potassium, calcium, iron, methylammonium, trimethylammonium, ethylammonium, diethanolammonium, ethanolammonium, dimethylamine, dimethylethanolamine, hydrazine and phenylhydrazine, and
b. a compound of the formula

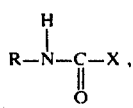

where R denotes methoxy, alkynyl of 5 carbon atoms or a 5-chloro-4-methylthiazolyl radical and X denotes phenoxymethyl bearing halogen and methyl substituents in the phenyl radical, dichlorophenyl, or lower alkyl
have a herbicidal action superior to that of their individual components.

Active ingredients $a$ and $b$ may be applied in amounts of 0.5 to 5 kg per hectare.

The weight ratio of $a : b$ is from 5:1 to 1:5, preferably from 3:1 to 1:3.

The compositions of the invention are suitable for controlling unwanted plants, e.g. dicotyledonous seed weeds, monocotyledonous grassy seed weeds and Cyperaceae in crops such as cereals, rice, soybeans, Indian corn, potatoes, peas, and beans.

The compositions may be used pre- and/or postemergence.

The agents according to the invention may be used as solutions, emulsions, suspensions oil dispersions, granules or dusts. The form of application depends entirely on the purpose for which the agents are being used; in any case it should ensure a fine distribution of the active ingredient.

For the preparation of solutions to be sprayed direct, mineral oil fractions of medium to high boiling point, such as kerosene or diesel oil, further coal-tar oils and oils of vegetable or mineral origin, and cyclic hydrocarbons such as tetrahydronaphthalene and alkylated naphthalenes are suitable.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g., polyethylene oxide adducts. Concentrates which are suitable for dilution with water may be prepared from active ingredient, wetting agent, adherent, emulsifying or dispersing agent and possibly solvent. Oils of various types may be added to ready-to-use spray liquors.

Dusts may be prepared by mixing or grinding the active ingredients with a solid carrier, e.g., clay or fertilizers.

Granules may be prepared by bonding the active ingredients to solid carriers.

Directly sprayable dispersions may also be prepared with oils.

The new compounds may be mixed with fertilizers, insecticides, fungicides and other herbicides.

EXAMPLE 1

The plants wheat (*Triticum aestivum*), barley (*Hordeum vulgare*), wild oats (*Avena fatua*), slender foxtail (*Alopecurus myosuroides*), catchweed bedstraw (*Galium aparine*), chickweed (*Stellaria media*) and henbit (*Lamium amplexicaule*) were treated at a growth height of 4 to 20 cm with the following amounts of the following individual active ingredients and compositions thereof, each active ingredient and each composition being emulsified or dispersed in 500 liters of water per hectare:

I 4-chlorobutyn-2-yl-1 N-3-chlorophenylcarbamate, 1 and 2 kg per hectare;
II 5-chloro-4-methyl-2-propionamide thiazole, 2 and 3 kg per hectare;
III 3,5-dibromo-4-hydroxybenzaldoxime-O-(2',4'-dinitrophenyl)-ether, 0.75 and 1.5 kg per hectare;
IV 9-hydroxyfluorenecarboxylic acid-(9), 1 and 3 kg per hectare;
V 3-isopropyl-2,1,3-benzothiadiazinone-(4)-2,2-dioxide, 0.75, 1.5, 2 and 3 kg per hectare;
I + V: 1.0 + 1.0 kg per hectare;
II + V: 2.0 + 1.0 kg per hectare;
III + V: 0.75 + 0.75 kg per hectare;
IV + V: 1.0 + 2.0 kg per hectare.

After 8 to 12 days it was ascertained that the compositions had a better overall action than the individual active ingredients, combined with good crop plant compatibility. The results are given below:

| Active ingredient kg/ha | I | | | | II | | III | | IV | | V | | | | I+V 1+1 | II+V 2+1 | III+V 0.75+0.75 | IV+V 1+2 |
|---|---|---|---|---|---|---|---|---|---|---|---|---|---|---|---|---|---|---|
| | 1 | 2 | 2 | 3 | 0.75 | 1.5 | 1 | 3 | 0.75 | 1 | 1.5 | 2 | 3 | | | | | |
| Triticum aestivum | 0 | 0 | 10 | 20 | 0 | 10 | 0 | 0 | 0 | 0 | 0 | 0 | 0 | | 0 | 10 | 0 | 0 |
| Hordeum vulgare | 0 | 0 | 10 | 20 | 5 | 15 | 0 | 15 | 0 | 0 | 0 | 0 | 0 | | 0 | 10 | 0 | 0 |
| Avena fatua | 70 | 90 | 50 | 70 | — | — | — | — | 5 | 5 | 5 | 5 | 10 | | 85 | 80 | — | — |
| Alopecurus myosuroides | 60 | 85 | 50 | 75 | — | — | — | — | 5 | 5 | 10 | 10 | 15 | | 80 | 80 | — | — |
| Galium aparine | 5 | 10 | 30 | 45 | 20 | 45 | 30 | 85 | 35 | 40 | 60 | 70 | 80 | | 80 | 90 | 90 | 100 |
| Stellaria media | 10 | 30 | 40 | 65 | 30 | 70 | 30 | 90 | 40 | 60 | 70 | 90 | 90 | | 90 | 100 | 100 | 100 |
| Lamium amplexicaule | 5 | 10 | 5 | 10 | 45 | 80 | 30 | 95 | 30 | 40 | 50 | 60 | 70 | | 75 | 75 | 100 | 100 |

0 = no damage
100 = complete destruction

EXAMPLE 2

The plants rice (*Oryza sativa*), soybeans (*Soja hispida*), Indian corn (*Zea mays*), wheat (*Triticum aestivum*), barnyard grass (*Echinochloa crus-galli*), giant foxtail (*Setaria faberii*), yellow nutsedge (*Cyperus esculentus*), common cocklebur (*Xanthium pensylvanicum*), wild mustard (*Sinapis arvensis*), waterplantain (*Alisma plantago-aquatica*), catchweed bedstraw (*Galium aparine*), chamomile (*Matricaria chamomilla*), slender foxtail (*Alopercurus myosuroides*) and annual bluegrass (*Poa annua*) were treated at a growth height of 4 Alopecurus 20 cm with the following individual active ingredients and compositions thereof, each active ingredient and each composition being emulsified or dispersed in 500 liters of water per hectare:

I 2,4'-dinitro-4-trifluoromethyldiphenyl ether, 1.5 and 3 kg per hectare;
II 4'-nitro-2,4,6-trichlorodiphenyl ether, 2 and 3 kg per hectare;
III N-(1,1-dimethylpropynyl)-3,5-dichlorobenzamide, 1 and 3 kg per hectare;
IV 2-(2-methyl-4-chlorophenoxy)-N-methoxyacetamide, 1 and 2 kg per hectare;
V 2,3,6-trichlorobenzoic acid, 0.5 and 2 kg per hectare;
VI 2-methoxy-3,6-dichlorobenzoic acid, 1.5 and 2 kg per hectare;
VII 3-isopropyl-2,1,3-benzthiadiazinone-(4)-2,2-dioxide, 0.5, 1, 1.5, 2 and 3 kg per hectare;
I + VII: 1.5 + 1.5 kg per hectare;
II + VII: 2 + 1 kg per hectare;
III + VII: 1 + 2 kg per hectare;
IV + VII: 1 + 1 kg per hectare;
V + VII: 0.5 + 1.5 kg per hectare;
VI + VII: 1.5 + 0.5 kg per hectare.

After 8 to 14 days it was ascertained that the compositions had a better overall action than the individual active ingredients, combined with good crop plant compatibility. The results are given below:

| Active ingredient kg/ha | I | | II | | III | | IV | | V | | VI | | VIII | | | | |
|---|---|---|---|---|---|---|---|---|---|---|---|---|---|---|---|---|---|
| | 1.5 | 3 | 2 | 3 | 1 | 3 | 1 | 2 | 0.5 | 2 | 1.5 | 2 | 0.5 | 1 | 1.5 | 2 | 3 |
| Oryza sativa | 10 | 25 | 10 | 20 | — | — | — | — | — | — | — | — | 0 | 0 | 0 | 0 | 0 |
| Soja hispida | 10 | 25 | — | — | 5 | 25 | — | — | — | — | — | — | 0 | 0 | 0 | 5 | 10 |
| Zea mays | — | — | — | — | — | — | 0 | 20 | — | — | — | — | 0 | 0 | 0 | 0 | 0 |
| Triticum aestivum | — | — | — | — | — | — | — | — | 0 | 20 | 10 | 15 | 0 | 0 | 0 | 0 | 0 |
| Echinochloa crus-galli | 65 | 95 | 60 | 90 | 40 | 80 | 40 | 70 | — | — | — | — | 0 | 5 | 5 | 10 | 10 |
| Setaria faberii | 65 | 90 | 60 | 90 | 35 | 70 | 45 | 75 | — | — | — | — | 0 | 5 | 5 | 10 | 15 |
| Cyperus esculentus | 45 | 80 | 30 | 55 | 20 | 55 | 5 | 10 | — | — | — | — | 20 | 36 | 45 | 65 | 90 |
| Xanthium pensylvanicum | 30 | 65 | 30 | 45 | 25 | 60 | 30 | 55 | — | — | — | — | 30 | 40 | 60 | 70 | 95 |
| Sinapis arvensis | 60 | 95 | 40 | 60 | 60 | 95 | 45 | 90 | — | — | — | — | 45 | 60 | 75 | 95 | 100 |
| Alisma plantago-aquatica | 30 | 50 | 15 | 30 | 20 | 55 | 20 | 45 | — | — | — | — | 20 | 40 | 60 | 75 | 80 |
| Galium aparine | — | — | — | — | — | — | — | — | 25 | 85 | 60 | 85 | 30 | 40 | 60 | 70 | 80 |
| Matricaria chamomilla | — | — | — | — | — | — | — | — | 30 | 95 | 65 | 90 | 35 | 50 | 60 | 90 | 95 |
| Alopecurus myosuroides | — | — | — | — | — | — | — | — | 50 | 95 | 45 | 80 | 5 | 5 | 15 | 10 | 15 |
| Poa annua | — | — | — | — | — | — | — | — | 55 | 100 | 60 | 95 | 5 | 5 | 5 | 5 | 10 |

— = no damage
100 = complete destruction

| Active ingredient kg/ha | I + VII 2.5 + 1.5 | II + VII 2 + 1 | III + VII 1 + 2 | IV + VII 1 + 1 | V + VII 0.5 + 1.5 | VI + VII 1.5 + 0.5 |
|---|---|---|---|---|---|---|
| Oryza sativa | 10 | 10 | — | — | — | — |
| Soja hispida | 10 | — | 5 | — | — | — |
| Zea mays | — | — | — | 0 | — | — |
| Triticum aestivum | — | — | — | — | 0 | 10 |
| Echinochloa crus-galli | 90 | 90 | 80 | 70 | — | — |
| Setaria faberii | 90 | 85 | 75 | 75 | — | — |
| Cyperus esculentus | 100 | 95 | 100 | 100 | — | — |
| Xanthium pensylvanicum | 100 | 100 | 100 | 100 | — | — |
| Sinapis arvensis | 100 | 100 | 100 | 100 | — | — |
| Alisma plantago-aquatica | 100 | 90 | 100 | 100 | — | — |

| Active ingredient kg/ha | I + VII 2.5 + 1.5 | II + VII 2 + 1 | III + VII 1 + 2 | IV + VII 1 + 1 | V + VII 0.5 + 1.5 | VI + VII 1.5 + 0.5 |
|---|---|---|---|---|---|---|
| Galium aparine | — | — | — | — | 100 | 95 |
| Matricaria chamomilla | — | — | — | — | 100 | 95 |
| Alopecurus myosuroides | — | — | — | — | 80 | 75 |
| Poa annua | — | — | — | — | 80 | 80 |

— = no damage
100 = complete destruction

I claim:

1. A herbicide composition comprising an inert solid or liquid carrier having dispersed therein a herbicidally effective amount of herbicides consisting essentially of
   a. a compound of the formula

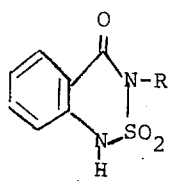

wherein R denotes alkyl of a maximum of four carbon atoms, or an alkali metal, ammonium, lower alkylammonium, lower hydroxyalkylammonium or lower alkyl lower hydroxyalkylammonium salt of said compound, and
   b. N-(1,1-dimethylpropnyl)-3,5-dichlorobenzamide in a weight ratio of $a$ to $b$ in the range of 3:1 to 1:3.

2. A herbicide composition as claimed in claim 1 wherein compound a is 3-isopropyl-2,1,3-benzothiadiazinone-(4)-2,2-dioxide.

* * * * *